United States Patent [19]

Markham, Jr. et al.

[11] Patent Number: 4,933,087
[45] Date of Patent: Jun. 12, 1990

[54] RECOVERY OF FATS AND PROTEINS FROM FOOD PROCESSING WASTEWATERS WITH ALGINATES

[76] Inventors: William M. Markham, Jr., Northwood Trailer Park, Lot 41, Harrisonburg, Va. 24482; John H. Reid, 6 River Oak Pl., Fredericksburg, Va. 22401; George L. Coffman, Box 265, Hwy. 989, Mt. Crawford, Va. 22841

[21] Appl. No.: 289,053

[22] Filed: Dec. 23, 1988

[51] Int. Cl.$^5$ .............................................. C02F 3/12
[52] U.S. Cl. .................................... 210/626; 210/725; 210/727; 210/730; 210/905; 210/926; 210/631
[58] Field of Search ............... 210/724, 725, 626, 905, 210/730, 926, 730, 666, 667, 694, 768, 727, 713, 631

[56] References Cited

U.S. PATENT DOCUMENTS

| | | | |
|---|---|---|---|
| 2,204,703 | 6/1940 | Sanders | 210/724 |
| 3,951,795 | 4/1976 | Doncer et al. | 210/724 |
| 4,001,114 | 1/1977 | Joseph et al. | 210/724 |
| 4,061,568 | 12/1977 | Hall | 210/905 |
| 4,565,635 | 1/1986 | Le Du et al. | 210/730 |

FOREIGN PATENT DOCUMENTS

| | | | |
|---|---|---|---|
| 2163830 | 6/1973 | Fed. Rep. of Germany | 210/905 |
| 132508 | of 1981 | Japan | 210/730 |
| 1232492 | 5/1971 | United Kingdom | 210/905 |

OTHER PUBLICATIONS van Gool, "Purification of Industrial Waste Waters", Jun./Jul. 1976, Nos. 391–392, pp. 277–278.
"Poultry Processing," *Journal WPCF*, vol. 53, No. 6, pp. 788–791.

Primary Examiner—Peter Hruskoci
Assistant Examiner—Krisanne Shideler
Attorney, Agent, or Firm—Marion P. Lelong

[57] ABSTRACT

A process is disclosed for treating food wastewaters by acidifying to a low pH, adding an alginate, and, preferably, adding lime to a pH of at least 7.0, without adding iron or aluminum to assist in coagulation and flocculation of the wastewater. A floc is formed at acid pH in some wastewaters and at neutral to alkaline pH in other wastewaters treated with lime. After recovery of the floc as a sludge, the process provides at least about 70% removals of Total Suspended Solids (TSS), Biochemical Oxygen Demand (BOD), and Chemical Oxygen Demand (COD) at reasonable costs and with negligible formation of free fatty acids in the resulting sludge.

19 Claims, 3 Drawing Sheets

RECOVERY OF FATS AND PROTEINS FROM FOOD PROCESSING WASTEWATERS WITH ALGINATES

BACKGROUND OF THE INVENTION

1. Field of the Invention

This invention relates to purification of wastewaters from food processing plants and particularly relates to use of polysaccharides for flocculation and coagulation of fats and proteins in such wastewaters.

2. Review of the Prior Art

In fish canneries, red meat slaughter and processing plants, and poultry slaughter and processing plants, large amounts of food wastewater, having high protein and fat contents, are produced. These wastewaters are commonly processed by: (a) pretreatment of the wastewaters in a Dissolved Air Flotation (DAF) process which is operated with or without chemical coagulants and flocculants and with air injection under pressure, producing a primary float sludge or "skimmings" (also termed "DAF waste sludge") and/or (b) biological oxidation under facultative or aerobic conditions or biological reduction or fermentation under anaerobic conditions to produce biological sludges.

Addition of chemical coagulants and flocculants in the dissolved air flotation process is preferred because these additives float additional proteins and soluble organic materials from the wastewater. Without such chemicals, the float sludge is termed "roughing sludge" which has a fat content of 75% or higher on a dry weight basis; with the chemicals, the sludge is termed "chemical float sludge" which has a fat content that can differ greatly among treatment plants.

The float sludge produced by dissolved air flotation with added chemical coagulants and flocculants from poultry slaughtering operations, for example, is a complex mixture which contains approximately 30–40% protein, 10% ash and fiber, and 40% fat on a dry weight basis and has a solids content ranging from 5% to 30%, but normally averaging about 10–15%. An analysis of one sample is as follows:

| Component | % |
|---|---|
| Water | 86.7 |
| Ash | 0.87 |
| Sulfur | 0.04 |
| Nitrogen | 0.28 |
| Carbon | 8.92 |
| Hydrogen | 1.36 |
| Oxygen | 1.88 |
| Energy | 1,984 BTU/pound |

The high fat content of poultry float sludge complicates the disposal process and increases its cost. A poultry slaughtering plant handling 70,000 birds per day (17,500,000 birds per year), averaging about four pounds per bird, produces 2,200–2,500 gallons daily (500,000 gallons yearly) of this float sludge which typically costs $0.02–0.08/per gallon for disposal. The disposal cost for float sludge is therefore $4,400 to $20,000 per year.

Experts in the poultry processing industry regard the disposal of float sludge as one of the major environmental problems facing the industry, particularly because aluminum or iron salts are commonly used to effect coagulation. The search for new technologies that do not introduce these food processing contaminants in food processing wastewaters has been accelerated in recent years by tighter governmental restrictions with respect to land applications and deep well injections. It has indeed become essential to avoid the disposal of sludges containing metals such as aluminum, zinc, copper, and iron on farmland or anywhere that might expose crops and/or water supplies to contamination with these metals.

According to the Kirk-Othmer "Encyclopedia of Chemical Technology", Third edition, 1978, Volume 10, current flocculants derived from natural products include starch, starch derivatives, plant gums, seaweed extracts, cellulose derivatives, proteins, and tannins, starch being the most important on the list by a considerable margin, followed by guar gum.

Sodium alginate is a polysaccharide flocculant which is produced from brown algae (seaweed) by alkaline extraction. Alginic acid is a linear copolymer from blocks of $\alpha$-(1→4)-D-mannuronic acid and $\beta$(1→4)-L-guluronic acid, as well as copolymers from these two monomer units.

The solid surface of a suspended particle in water tends to have a net electrical charge, balanced by ions of opposite charge in solution in the vicinity of the particle surface. This situation of a charge localized on the particle surface, with a diffuse distribution of counterions extending into the liquid medium, is referred to as an ionic double layer.

The surface charge generates a repulsive force between particles, tending to keep them apart. For large particles, gravitational forces cause them to settle out of the suspension, but for individual particles of colloidal dimensions, such as the proteins of blood, the electrostatic and microhydrodynamic forces dominate and make their suspensions relatively stable. If these colloidal particles aggregate into larger entities for which gravitational forces dominate, suspension stability is lost. This formation of aggregates is termed flocculation; an aggregate thus formed is termed a floc or floccule, and any chemical agent that enhances the process is termed a flocculating agent or a flocculant.

Based on one engineering usage, coagulation represents the overall aggregation process, and flocculation represents the particle transport step.

According to Technical Bulletin DB-1, "Kelgin and Kelvis Algins", of the Kelco Division of Merck & Co., Rahway, New Jersey, algin solutions dissolve completely in either cold or hot water by slow addition with maximum agitation. Algin solutions are not coagulated by heat or gelled by cooling and maintain smooth flow characteristics over a wide range of temperatures.

Sodium alginate is recognized by the Food and Drug Administration as one of the substances affirmed generally recognized as safe, in accordance with 21 CFR 184.1724.

U.S. Pat. No. 3,627,680 teaches the clarification of water by flocculation, using a dispersion of 1 g/l of cellulose-free sodium alginate in demineralized water as a flocculation additive, so that the alginate in the water being clarified is at 0.2–0.5 p.p.m. Surprisingly, it was found that pure sodium alginate is totally ineffective in water treatment because the alginate, being extremely reactive, forms a calcium alginate gel with the calcium ions present in the water and thus loses its colloidal dispersion properties.

U.S. Pat. No. 3,951,795 describes a process for treating wastewaters from the food processing industry, particularly meat packing houses, meat canning, and the like meat processing operations. The wastewater is mixed in a first treating zone with an aqueous solution of a ferric salt until a pH of 3-5 is obtained. The resulting mixture is mixed in a second treating zone with calcium hydroxide until a pH of 7-8 is achieved and is then allowed to settle. The settled liquid is filtered on a rotary vacuum filter, using a filter aid.

U.S. Pat. No. 4,061,568 relates to a method for recovering fatty and proteinaceous substances from wastewaters produced by the fat processing industry, such as fat refining plants and margarine plants. An acid hydrolyzing metal salt, e.g., an $Fe^{3+}$ salt, is used to form a complex compound with the fatty substances. After thorough mixing and a sufficient reaction time, an alkaline earth hydroxide, e.g., Ca (OH)$_2$, is added, precipitating the complex as a co-precipitate which can be separated as a sludge by sedimentation, centrifugation, or flotation. However, if the amount of proteins in the wastewater is substantial in relation to that of fat, i.e., more than 10% of the total amount of solids in the process water, it may be necessary to reduce the pH below 4 with a mineral acid before, simultaneously, or after the addition of the acid hydrolyzing metal salt. This step is quite necessary with water soluble proteins but is less necessary with colloidal proteins/fatcontaining effluent.

U.S. Pat. No. 4,565,635 relates to purifying potable waters by flocculation with heteropolysaccharide biogums, a dispersion/dissolution enhancing amount of a water donor material, and, advantageously, an anionic and/or nonionic surfactant. The biogums may be seaweed gums, including algins and alginates. The water donor component may be hydrated silica, finely precipitated silica, hydrated silica gels, or dehydrated silica gels of specified BET surface area, pore volume, and average particle diameter, or may be an alumina hydrate or hydrated silica aluminates. Exemplary anionic surface active agents include soaps of alkali metals, alkali sulfonates, sulfates and sulfate products, and alkaline phosphates. Exemplary nonionic surfactants include polyoxyethylene alkylphenols, aliphatic polyoxyethylene alcohols, fatty amides, and polyoxyethylene and polyoxypropylene derivatives. A conventional flocculating agent, based upon a metal of the iron and/or aluminum group, first must be introduced into the water to be treated, and thereafter the flocculating adjuvant comprising the water soluble gum/polymer is added.

SUMMARY OF THE INVENTION

It is accordingly an object of this invention to provide a process for coagulating and flocculating fats and proteins in food processing wastewaters by admixing biogums in the form of alginates, without addition of iron or aluminum or syntheticpolymers.

It is another object to provide a process for recovering these coagulated and flocculated fats and proteins without use of a filter aid.

It is an additional object to provide a process for treating digested or undigested biological activated sludges with alginates to obtain concentrated sludges.

It is a further object to provide a process for utilizing sludges, produced from raw food processing wastewaters, which can be rendered into foods suitable for animal consumption.

In accordance with these objects and the principles of this invention, it surprisingly has been discovered that:

(a) admixing an alginate with a food wastewater that is at low pH creates a useful though somewhat small, fragile floc, (b) that maintaining blood-containing wastewater at this low pH for at least 3 minutes (before or after alginate admixing) enables the floc additionally to withdraw blood proteins, such as hemoglobin, from the wastewater, as evidenced by a reddish color of the clear liquid changing to a yellow color after floc formation and initial settling, (c) that adding hydrated lime, suitably as a powder, slurry, or solution, to the alginate/acidified wastewater mixture creates a stronger, larger, and more abundant floc in some wastewaters, and (d) that adding activated biological sludge to the alginate/acidified wastewater mixture greatly improves the coagulating qualities of the floc.

More specifically, the low pH is 3.0 to 4.5, and the pH to which the lime addition should bring the wastewater is at least 7.0 and up to about 8.5. The specific low pH and the specific high pH are determined by the characteristics of the wastewater. However, these characteristics can not be predicted and must be determined experimentally. Wastewater having high conductivity requires more alginate than wastewater of low conductivity. High conductivity materials such as sodium chloride consequently should not be added to the wastewater or allowed to become part of the wastewater during slaughtering and/or meat processing operations. The process generally comprises:

A. admixing an acid with the wastewater until a selected acidification pH within the range of about 3.0 to 4.5 is achieved and admixing a selected quantity of an alginate until a useful floc is obtained, the amount of the acid and the quantity of alginate being in accordance with characteristics of the wastewater and in order to produce the useful floc; and B. recovering the floc as a sludge from the wastewater.

The acid and the alginate may be added simultaneously or in either order, but some wastewaters form a better floc if acidification is performed first and the alginate is added after a waiting period of about three minutes. An aqueous solution of the alginate is preferably added to the raw wastewater to a final concentration range of 20 ppm to 50 ppm, depending upon the characteristics of the water, e.g., higher BOD and higher conductivity of the water require more alginate.

The floc may be recovered by floating (as in a float cell) after addition of dissolved air without addition of other flocculation and/or coagulation chemicals, by settling as in a clarifier without additional coagulants, or by filtering as with a rotary filter without addition of filter aids. Tighter floc has been observed to form in some wastewaters if particulate additives, such as finely-milled peat, acidified peat, or activated carbon, are included in the flocculant-wastewater mixture, but such additives are not at all necessary for other wastewaters.

Activated sludge from a secondary wastewater treatment system, such as the clarifier following an oxidation ditch, is a preferred additive which much improves the effectiveness of the alginate and thereby enables the amount of alginate to be significantly reduced.

The quantity of alginate that should be added is generally 30-50 ppm and as low as 5 ppm if activated sludge is added. Although adding additional quantities of alginate solution creates a greater removal of biochemical oxygen demand (BOD) and chemical oxygen demand (COD), it is generally undesirable to do so as a matter of economics because recovery increases asymptotically with increase in alginate addition; such further purification is performed more economically with aerobic bacteria in a secondary treatment system, such as a total barrier oxidation ditch.

The acid, alginate, and other additives are preferably admixed with the wastewater within a mixing tube or flocculating tanks wherein time delays required for mixing and/or low pH maintenance are determined by distance along the tube, but mixing within one or more treatment tanks is satisfactory.

It was discovered that the presence of large amounts of blood in the wastewater requires acidification to a lower pH. With small amounts of blood, acidification to pH 4.5 is satisfactory, but with large amounts of blood, an acidification pH of 3.0 to 3.5 is necessary. Furthermore, only those wastewaters laden with blood require a waiting period of 3–5 minutes. With wastewater from a further processing plant, containing no blood but much carbohydrate, there is no benefit in holding the acidified wastewater for at least three minutes.

It was also discovered that some food wastewaters are very difficult to flocculate. Admixing 30–150 ppm of alginate to the beef wastewater from a meat plant, for example, made little difference. Lignosulfonates are presently used on such wastewater, producing about 65% removal of BOD.

It was accordingly quite surprising that additional use of 10% of activated sludge from the clarifier of a secondary aerobic biological treatment plant produces 86.3% removal of total suspended solids (TSS), 80.8% removal of chemical oxygen demand (COD), and 75.9% removal of total Kjeldahl nitrogen (TKN) and that use of 25% activated sludge produces 95.6% TSS removal, 81.9% COD removal, and 81.9% TKN removal.

Other wastewaters flocculate readily after acidification and alginate addition. Still others perform best if acidified peat, finely milled peat, or activated carbon is added, but some give excellent results only if activated sludge is used. Many give good flocculation only if lime is admixed to a neutralization pH of 7.0–8.5 before sludge recovery is done. Lime and/or sludge admixture is desirable with any embodiment of the invention, as shown in the drawings, if the wastewater responds well to such addition.

DESCRIPTION OF THE PREFERRED EMBODIMENTS

Figure 1:
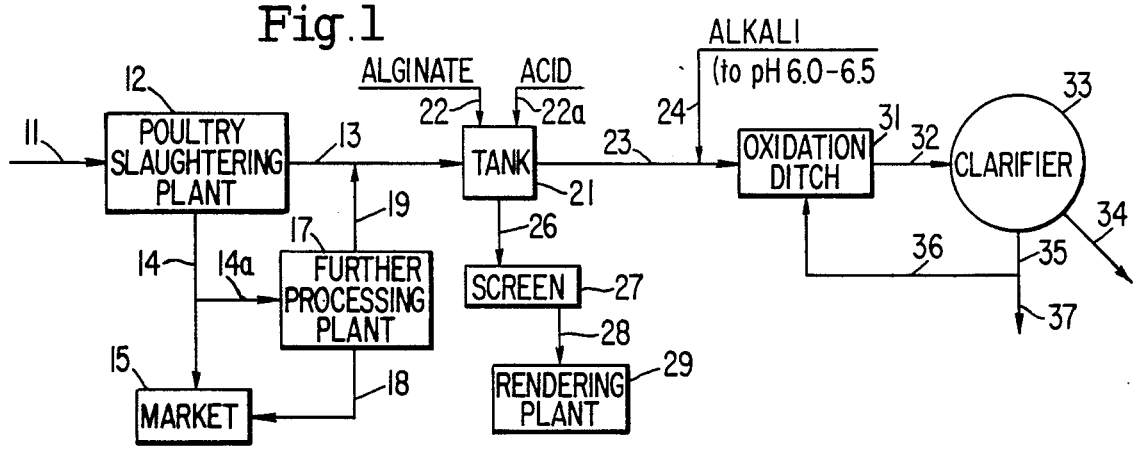
FIG. 1 is a flow sheet of the basic process for treatment of wastewater from a food processing plant, such as a poultry slaughtering plant, and/or a further processing plant.

Referring to FIG. 1 which relates to a poultry slaughtering plant 12 for illustration of a food preparation plant, birds 11 enter plant 12 and leave as chilled poultry 14 for market 15 or as poultry 14a for treatment in further processing plant 17 which produces poultry products 18 for market 15 and carbohydrate-laden wastewater stream 19, joining blood-laden wastewater stream 13 which is fed to treatment tank 21. As additional feeds to tank 21, an alginate stream 22, in the form of sodium or potassium alginate or a solution thereof, and an acid, preferably sulfuric acid, are added in either sequence to produce a pH less than 4.5 in tank 21.

The floc is recovered to produce a sludge stream 26 which is fed to a sludge thickening unit 27, such as a filter, a float cell, or a clarifier. The thickened sludge 28 is finally fed to rendering plant 29 where it is blended with other byproducts to produce edible materials.

The partially purified wastewater stream from treatment tank 21 is fed as stream 23 to a secondary treatment unit 31, such as a complete mix tank or an oxidation ditch, after alkali stream 24 is added to stream 23 to produce a pH of 6.0 to 6.5. The oxidation ditch serves as an exemplary secondary treatment unit, producing mixed liquor stream 32 which is fed to clarifier 33. Clear liquor stream 34 from clarifier 33 is fed to a lake or stream after disinfection thereof, and settled activated sludge stream 35 is split into a return sludge stream 36 and a waste activated sludge stream 37.

Figure 2:
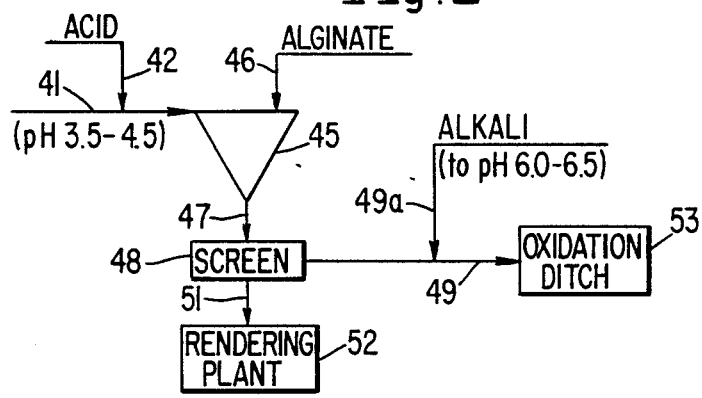
FIG. 2 is a flow sheet of the process while using specific types of equipment.

Referring to FIG. 2, wastewater stream 41 is admixed with acid stream 42 to a pH of 3.5 to 4.5 and fed to coagulation-flocculation tank or tube 45 or a similar device to which is also fed sodium or potassium alginate stream 46 in either solid or solution form. The resultant mixture containing floc is then fed as stream 47 to a rotary filter or shaker screen 48 which produces sludge 51 which is fed to rendering plant 52 and wastewater stream 49 which is fed to oxidation ditch 53 for biological treatment and subsequent clarification, as shown in FIG. 1, after pH adjustment to pH 6.0–6.5 with alkali stream 49a. The screen has a pore size of 20 thousandths of an inch or less.

Figure 3:
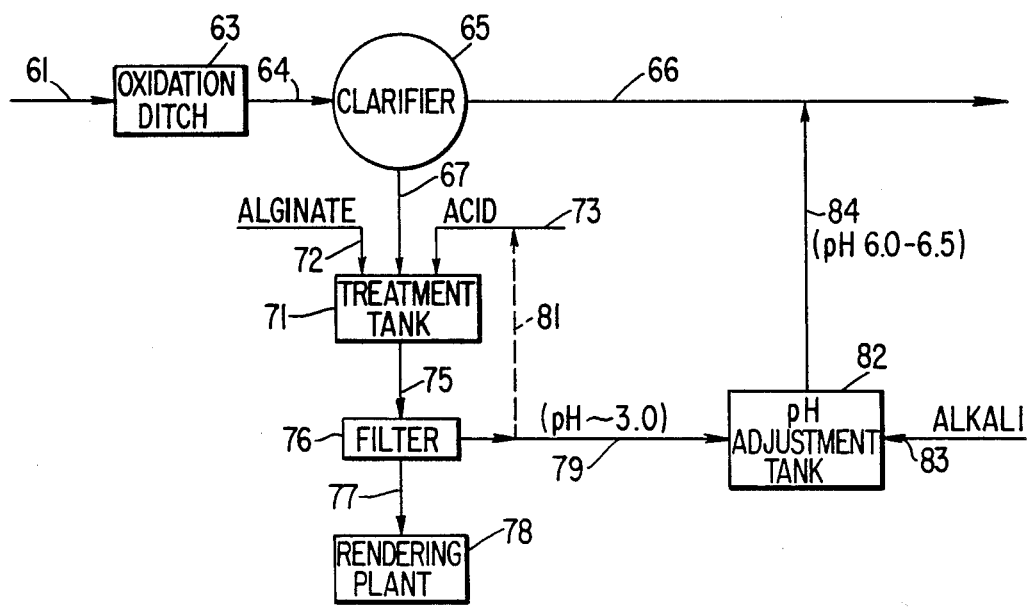
FIG. 3 is a flow sheet illustrating use of the process for treating activated sludge from an untreated wastewater.

Referring to FIG. 3, food wastewater stream 61 is fed to oxidation ditch 63 which produces mixed liquor stream 64 which is fed to clarifier 65, producing clear liquor stream 66 and activated sludge stream 67. For the purposes of this invention, however, sludge stream 67 can be either digested or undigested. Sludge stream 67, alginate stream 72, and acid stream 73 are fed to treatment tank 71 until a pH of about 3.0 is obtained, depending upon characteristics of stream 61.

The product of tank 71 is a flocculated sludge stream 75 which is fed to rotary filter 76 from which concentrated sludge stream 77 is produced and fed to rendering plant 78. Filter 76 also produces wastewater stream 79 which is fed to pH adjustment tank 82 or alternatively is returned as stream 81 to join acid stream 73, whereby the quantity of acid to be added is reduced. Alkali stream 83 is also fed to tank 82 for pH adjustment of stream 79, thereby producing a wastewater stream 84 having a pH of 6.0 to 6.5 which is suitably combined with clarified liquor stream 66.

Figure 4:
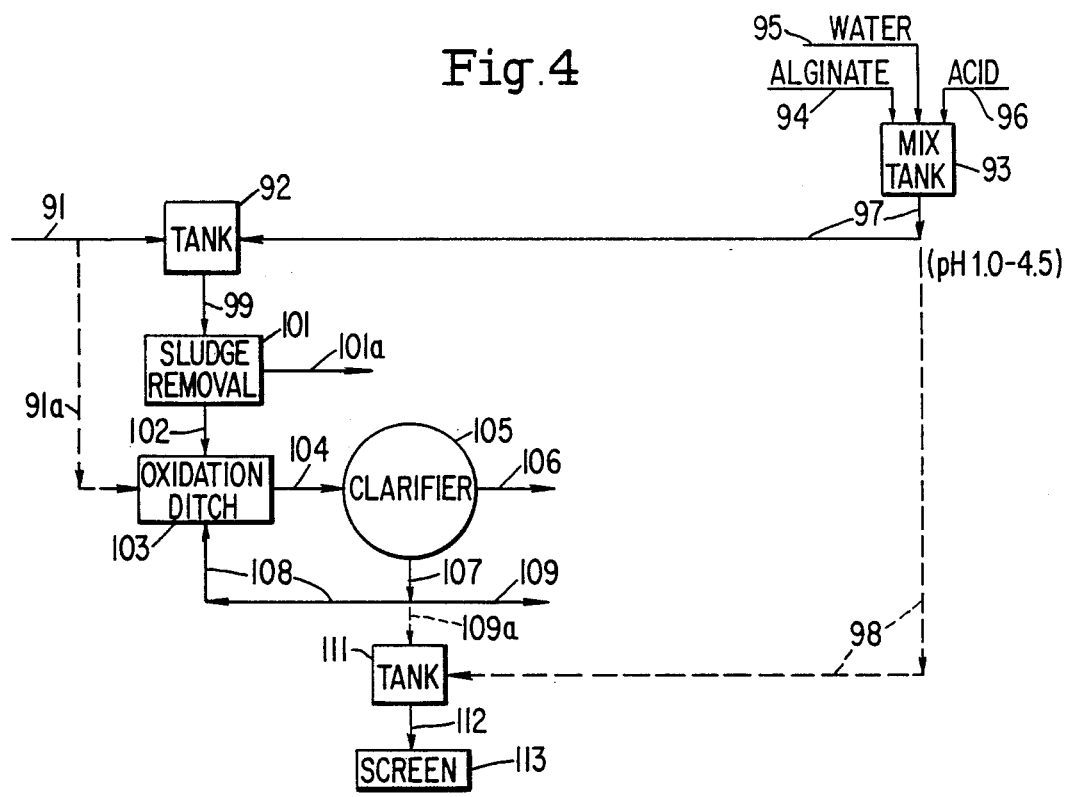
FIG. 4 is a flow sheet of another embodiment of the process in which the alginate is acidified for preservation before being used for treatment of the wastewater or of the activated sludge.

Referring to FIG. 4, wastewater stream 91 is fed to treatment tank 92 or alternatively is fed as stream 91a to oxidation ditch 103. Alginate 94, water 95, and acid 96 are fed to mixing and preserving tank 93, wherein the alginate is stored at a pH of 1.0 to 4.5. Acidified alginate stream 97 is fed to tank 92 or alternatively is fed to treatment tank 111.

The flocculated wastewater in tank 92 is then fed as stream 99 to sludge removing unit 101, such as a rotary filter, clarifier, or float cell, producing flocculated sludge stream 101a and wastewater stream 102 which is fed to oxidation ditch 103. The mixed liquor from ditch 103 is fed to clarifier 105 as stream 104, producing clarified liquor stream 106 and activated sludge stream 107 which is split into return sludge stream 108 and waste activated sludge stream 109.

In the event, however, that raw wastewater stream 91 alternatively is fed as stream 91a to oxidation ditch 103 and alginate stream 97 alternatively is fed as stream 98 to treatment tank 111, waste activated sludge stream 109a is also fed to tank 111. The activated sludge is therein flocculated and concentrated to form sludge stream 112 which is fed to rotary filter, screen, or press 113 for recovery of concentrated sludge to be fed to a rendering plant, as shown in FIGS. 1–3.

Figure 5:
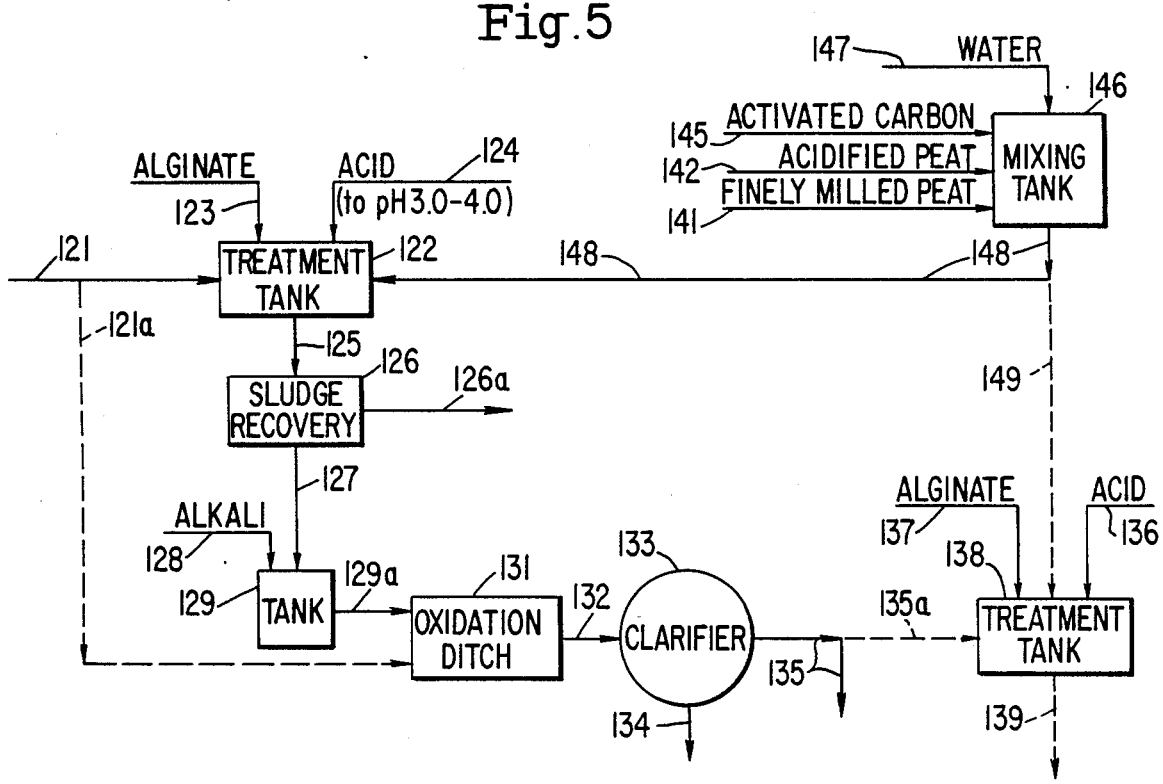
FIG. 5 is a flow sheet showing formation of a slurry of acidified peat, finely milled peat, or activated carbon and addition of the material to the wastewater/acid/alginate mixture or, alternatively, to the activated sludge produced by biological purification of the untreated wastewater.

Referring to FIG. 5, wastewater stream 121 is fed to treatment tank 122 to which alginate stream 123 and acid stream 124 are also fed. Finely milled peat 141, acidified peat 142, or activated carbon 145 and water stream 147 are fed to and slurried within mixing tank 146 at about pH 3.0–4.0. The resultant mixture is fed as slurry stream 148 to tank 122. The flocculated material in tank 122 is fed as stream 125 to sludge recovery unit 126, producing sludge stream 126a and wastewater stream 127 which is fed to pH adjustment tank 129, to which alkali stream 128 is also fed, and then as stream 129a at pH 6.0–6.5 is fed to oxidation ditch 131. Sludge stream 126a is fed to a rendering plant, as shown in FIGS. 1–3. Mixed liquor stream 132 from ditch 131 is fed to clarifier 133, producing clarified liquor stream 134 and activated sludge stream 135.

When, as an alternative, wastewater stream 121 is diverted as stream 121a to oxidation ditch 131, additive slurry stream 148 is also fed as stream 149 to treatment tank 138 to which activated sludge stream 135a, acid stream 136, and alginate stream 137 are also fed, producing treated stream 139 for feeding to a screw or press and recovery of treated, concentrated activated sludge which is suitable for feeding to a rendering plant, as shown in FIGS. 1–3.

Figure 6:
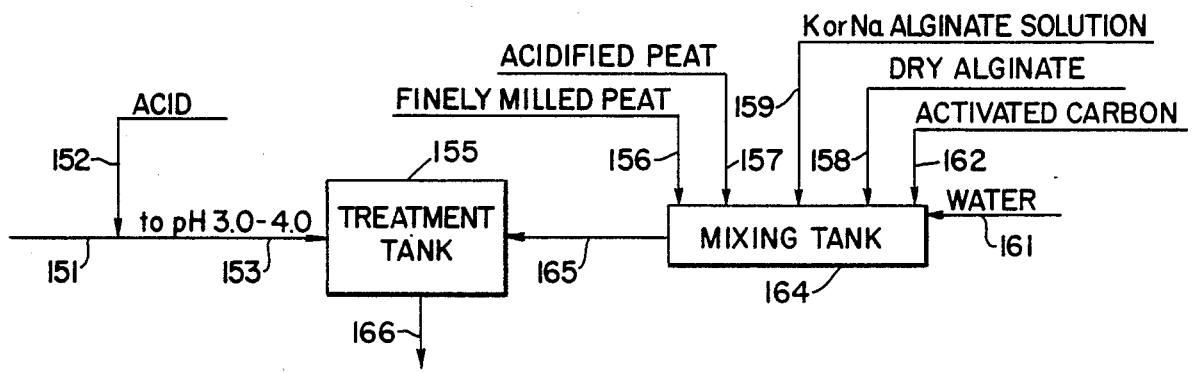
FIG. 6 is a flow sheet showing formation of a slurry as in FIG. 5, using an alginate solution or dry alginate plus water in addition to finely milled peat, acidified peat, or activated carbon, and admixing it with the acidified wastewater at a pH of 3.0 to 4.0 to produce coagulation-flocculation of the wastewater.

Referring to FIG. 6, wastewater stream 151 is admixed with acid stream 152 to a pH of 3.0 to 4.0 and fed to treatment tank 155 to which a slurry stream 165 is also fed. Slurry stream 165 is formed by admixing in mixing tank 164 a water stream 161 with one or more of the following materials: finely milled peat 156, acidified peat 157, dry alginate 158, and activated carbon 162. In lieu of water and dry alginate, a stream 159 of potassium or sodium alginate solution may be fed to tank 164.

The coagulated-flocculated wastewater in tank 155 is discharged as stream 166 to a sludge recovery unit, such as a float cell, a screen or rotary filter, or a clarifier, wherein flocculated sludge is separated from a partially purified wastewater stream which is fed to a secondary treatment unit, such as an oxidation ditch, for aerobic biological purification. A portion of its mixed liquor is continuously discharged to a clarifier for clarification and activated sludge recovery as described with respect to FIGS. 1, 3, and 4.

Figure 7:
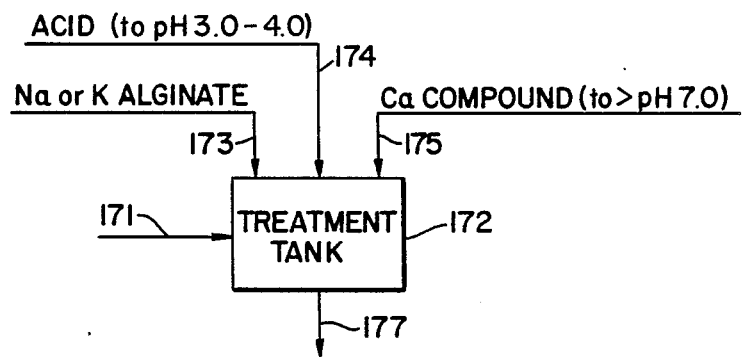
FIG. 7 is a flow sheet showing admixing of acid and alginate to the wastewater or, alternatively, to the activated sludge, to obtain a pH of 3.0 to 4.5 and then admixing lime therewith to obtain a pH of 7.0 to 9.0.

Referring to FIG. 7, wastewater stream 171 is fed to treatment tank 172 to which is also added an alginate stream 173 of sodium or potassium alginate solution, an acid stream 174, and a calcium compound in solution or slurry form as stream 175. The alginate and acid are added simultaneously or in either sequence to a pH of 3.0 to 4.0. Calcium-containing stream 175 is then admixed to a pH of at least 7.0 and preferably no higher than 8.5. The coagulated and flocculated product is discharged as stream 177 for filtering and further treatment as discussed with respect to FIGS. 1–3.

Figure 8:
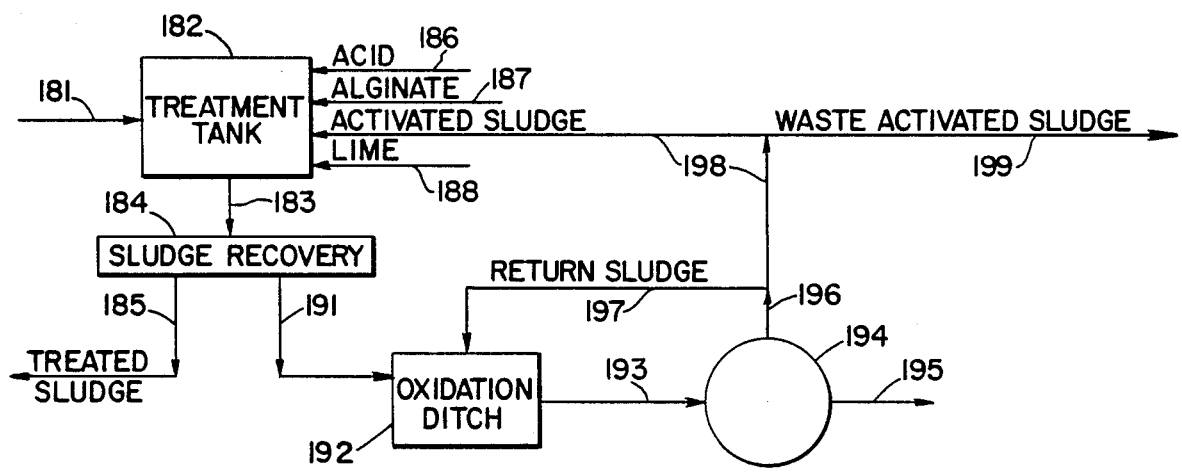
FIG. 8 is a flow sheet showing admixture of acid, alginate, activated sludge, and lime with incoming wastewater, as in FIG. 7, recovering the fatty sludge, feeding the partially purified wastewater to an oxidation ditch, clarifying its mixed liquor, and feeding a portion of the activated sludge to the incoming wastewater.

Referring to FIG. 8, wastewater stream 181 is fed to treatment tank 182 to which acid stream 186, alginate stream 187, activated sludge stream 198, and lime stream 188 are also fed. Acidification of the mixture of wastewater and activated sludge is done with rapid mixing to a pH within the range of 3.0–4.0, depending upon the characteristics of the wastewater in stream 181. Then lime stream 188, as a powder, slurry, and/or solution, is fed to tank 182 until a pH of at least 7.0 is achieved and a good floc is noted.

Treated slurry 183 is next fed to sludge recovery unit 184, such as a rotary filter, floc clarifier, or screw press, producing treated sludge stream 185 and treated wastewater stream 191. Sludge stream 185 is suitable for feeding to a rendering plant, as discussed with reference to FIGS. 1–3.

Wastewater stream 191 is fed to oxidation ditch 192 which contains a mixed liquor comprising facultative heterotrophic microorganisms. These microorganisms are avid feeders on the contents of stream 191 and rapidly digest them to produce additional microorganisms in the mixed liquor during cyclical flow within the channel of the oxidation ditch and transfer of oxygen to the liquor.

Mixed liquor stream 193 is discharged from ditch 192 and fed to clarifier 194 in which the mixed liquor is separated by settling to form clarified liquor stream 195 and activated sludge stream 196. A portion of stream 196 is fed to ditch 192 as return sludge stream 197, but most, if not all, of the remainder is fed to tank 182 as sludge feed stream 198. Any remaining sludge is removed as waste activated sludge stream 199.

EXAMPLE 1

To one liter of raw wastewater from a poultry slaughtering plant was added 2N $H_2SO_4$ unitl a pH of 4.5 was achieved. Sodium alginate was added to a final concentration of 60 ppm, and a slurry of hydrated lime was added to raise the pH to 8.5. The floc particles were large, most settling within a few minutes. However, the fluid was reddish, apparently because a significant amount of blood protein remained.

EXAMPLE 2

The experiment of Example 1 was repeated, except that acid was added until pH 3.5 was achieved. After floc settling, the fluid had a yellowish color, and the floc particles were more red in color than those of Example 1.

EXAMPLE 3

To one liter of further processing wastewater (e.g., stream 19 in FIG. 1), 30 ppm of sodium alginate were added. The water was then acidified with dilute sulfuric acid to pH 3.0, and lime was added immediately until a pH of 8.0 was achieved. The resultant floc was allowed to sediment for 30 minutes, and about 250 ml of the clear supernatant fluid was decanted, resulting in these findings:

| Material | Total suspended solids, mg/l | BOD mg/l | COD mg/l |
|---|---|---|---|
| Raw water | 1,347 | 1,362 | 4,520 |
| Treated water | 149 | 430 | 765 |
| Removals, % | 88.9 | 68.4 | 83.1 |

EXAMPLES 4–8

The following series of tests in Table I were made on samples of raw wastewater obtained from three poultry slaughtering plants in the Shenandoah Valley of Virginia after addition of sodium alginate solution to a final concentration of 30 ppm to 1-liter grab samples, subsequent acidification of the samples to pH 3.0 with 2N $H_2SO_4$, allowing a waiting period of 5 minutes, the addition of hydrated lime until a pH of 8.0, and sedimentation for 30 minutes, as in Example 3. Debris (largely grease and oil), which was floating on the top of the fluid, was carefully aspirated, and about one fourth of the supernatant fluid was decanted. This decanted fluid and the respective raw waters were tested for total suspended solids, BOD, COD, and TKN.

It was believed that exposure of the wastewater to both acidic and alkaline conditions should minimize the bacterial formation of free fatty acids in the sludge during storage, thereby improving its quality in terms of renderability. Table III shows the rate of formation of free fatty acids during 72 hours of room temperature storage of sludge generated by the alginate floccing method of this invention.

EXAMPLE 9

A beaker containing beef wastewater from a beef slaughtering plant was treated with 50 ppm of sodium alginate after acidification to about pH 3.0, and lime was admixed to about pH 8.0 with rapid stirring. It was visually evident that the floc was poor.

EXAMPLE 10

Another sample of the same beef wastewater was acidified to the same pH; activated sludge, as 10% by weight of the wastewater, and 50 ppm of sodium alginate solution were admixed. After lime addition to pH 8.0, a very good, rapid settling floc resulted.

EXAMPLE 11

Next, to determine the effectiveness of lime addition alone on this beef wastewater, lime slurry was admixed with a third sample of the beef wastewater, producing a "pin" floc that settled slowly and appeared gritty. It was clearly unsatisfactory.

TABLE I

Example 12 - Raw wastewater from Plant No. 1, having a conductivity of 740 micromhos/cm and treated with 60 ppm of alginate

| Water | TSS, mg/l | BOD, mg/l | COD |
|---|---|---|---|
| Untreated | 1,510 | 1,896 | Not determined |
| Treated | 34 | 375 | Not determined |
| Removals | 97% | 80% | — |

Example 13 - Raw wastewater from Plant No. 2, having a conductivity of 4,800 micromhos/cm and treated with three levels of alginate

| Water | BOD, mg/l | COD, mg/l |
|---|---|---|
| Untreated | 1,911 | 2,930 |
| Treated, ppm: | | |
| 30 | 488 | 798 |
| 40 | 443 | 656 |
| 60 | 376 | 570 |
| Removals: | | |
| 30 | 74% | 73% |
| 40 | 77% | 78% |
| 60 | 80% | 80% |

Example 14 - Raw wastewater from Plant No. 3, having a conductivity of 620 micromhos/cm and treated with three levels of alginate

| Water | BOD, mg/l | COD, mg/l |
|---|---|---|
| Untreated | 1,068 | 2,280 |
| Treated, ppm: | | |
| 20 | 418 | 706 |
| 30 | 348 | 540 |
| 40 | 322 | 484 |
| Removals: | | |
| 20 | 61% | 69% |
| 30 | 67% | 76% |
| 40 | 70% | 79% |

Example 15 - Raw wastewater from Plant No. 1 (9 days after Example No. 4), having a conductivity of 760 micromhos/cm and treated with three levels of alginate

| Water | TSS, mg/l | COD, mg/l | TKN, mg/l |
|---|---|---|---|
| Untreated | 1,337 | 3,240 | 89.9 |
| Treated, ppm: | | | |
| 30 | 122 | 740 | 65.5 |
| 40 | 82 | 606 | 48.8 |
| 60 | 72.7 | 662 | 65.1 |
| Removals: | | | |
| 30 | 91% | 77% | 27% |
| 40 | 94% | 81% | 46% |
| 60 | 95% | 80% | 27% |

Example 16 - Raw wastewater from Plant No. 3 (5 days after Example No. 6), having a conductivity of 630 micromhos/cm and treated with three levels of alginate

| Water | TSS, mg/l | COD, mg/l | TKN, mg/l |
|---|---|---|---|
| Untreated | 1,173 | 4,380 | 114.7 |
| Treated, ppm: | | | |
| 20 | 74.7 | 524 | 73.6 |
| 30 | 50 | 582 | 66.6 |
| 40 | 60 | 536 | 46.8 |
| Removals: | | | |
| 20 | 94% | 88% | 36% |
| 30 | 96% | 87% | 42% |
| 40 | 95% | 88% | 59% |

TABLE II

FREE FATTY ACID FORMATION IN ALGINATE-GENERATED SLUDGE (50 MG/ML DRY WEIGHT SOLIDS) OF EXAMPLE NO. 4

| Hours of storage (room temperature | % FFA |
|---|---|
| 0 | 0 |
| 24 | 0.1 |
| 48 | 0.2 |

TABLE II-continued

FREE FATTY ACID FORMATION IN
ALGINATE-GENERATED SLUDGE (50 MG/ML
DRY WEIGHT SOLIDS) OF EXAMPLE NO. 4

| Hours of storage (room temperature) | % FFA |
|---|---|
| 72 | 0.45 |

What is claimed is:

1. A process for coagulating and flocculating fats and proteins in food processing wastewaters without addition of iron or aluminum or synthetic polymers and for recovering said coagulated and flocculated fats and proteins without use of a filter aid, comprising:
   A. admixing an effective amount of an acid with a food processing wastewater to produce an acidified wastewater having an acidification pH within the range of about 3.0 to 4.5;
   B. admixing an effective amount of an activated sludge, an effective amount of lime, and an effective amount of an alignate with said acidified wastewater to produce a useful floc, the amount of said acid being sufficient to produce a yellow color in clear supernatant liquid of said wastewater after floc formation and initial settling of said floc; and
   C. recovering said floc as a sludge from said wastewater, said sludge being suitable for feeding to a rendering plant.

2. The process of claim 1, wherein said wastewater is produced by a further processing plant for slaughtered meat.

3. The process of claim 1, wherein a particulate additive, selected from the group consisting of finely milled peat, acidified peat, and activated carbon, is admixed with said wastewater in addition to said alginate and said acid in order to produce said useful floc.

4. The process of claim 1, wherein:
   A. said clear supernatant liquid is reddish when less than said effective amount of said acid is added to said wastewater; and
   B. said wastewater is maintained at said acidification pH for at least three minutes before addition of said alginate in order to allow for said changing from said reddish color to said yellow color in said clear supernatant liquid.

5. The process of claim 4, wherein said wastewater is produced by a slaughtering plant.

6. The process of claim 1, wherein said recovering of said floc as said sludge in said step C of claim 1 separates said sludge from a partially purified wastewater.

7. The process of claim 6, wherein:
   A. said lime is added to the acidified and alginate-treated wastewater to a neutralization pH within the range of 7.0 to 8.5 to produce a neutralized sludge; and
   B. said neutralized sludge is fed to said rendering plant, said neutralized sludge having improved quality, in terms of renderability thereof, by exposure to both acidic and alkaline conditions, whereby bacterial formation of free fatty acids is minimized during storage.

8. The process of claim 6, wherein said partially purified wastewater is admixed with an alkali to a selected pH within the range of 6.0–6.5.

9. The process of claim 8, wherein said partially purified wastewater, having said selected pH, is fed to a secondary wastewater treatment system.

10. The process of claim 9, wherein said system comprises an oxidation ditch, which contains mixed liquor and to which said wastewater is fed, and a clarifier which receives said mixed liquor from said oxidation ditch and produces said activated sludge, a portion of which is admixed with said wastewater and said effective amounts of lime and alginates in said step B of claim 1, whereby the necessary quantity of said alginate to produce said useful floc is reduced.

11. The process of claim 10, wherein said portion of said activated sludge is about 10% to about 25% of said wastewater.

12. The process of claim 11, wherein said reducing of said alginate is from about 30–50 ppm to as low as 5 ppm by said admixing of said activated sludge.

13. The process of claim 1, wherein said lime is admixed with said wastewater to a neutralization pH of at least 7.0 in order to produce said useful floc.

14. The process of claim 13, wherein said neutralization pH is within the range of 7.0 to 8.5.

15. The process of claim 13, wherein said recovering in said step C of claim 1 additionally produces partially purified wastewater which is fed to a secondary wastewater treatment system.

16. The process of claim 15, wherein said system comprises an oxidation ditch and a clarifier which produces activated sludge, a portion of said sludge being admixed with said wastewater, said acid, and said alginate, whereby said quantity of said alginate is reduced.

17. The process of claim 16, wherein at least about 70% of Total Suspended Solids (TSS), Biochemical Oxygen Demand (BOD), and Chemical Oxygen Demand (COD) are removed from said wastewater as components of said recovered sludge, with negligible formation of free fatty acids in said recovered sludge during storage thereof.

18. A process for aerobically treating a raw wastewater from a food processing plant, said wastewater containing protein and fat, to produce activated sludges and for treating said sludges with alginates to produce concentrated sludges, comprising:
   A. feeding said wastewater to a secondary aerobic biological treatment plant containing aerobic microorganisms in a mixed liquor and admixing said wastewater with said mixed liquor;
   B. feeding said mixed liquor to a clarifier and obtaining activated sludge therefrom;
   C. admixing a particulate additive selected from the group consisting of finely milled peat, acidified peat, and activated carbon with said activated sludge to produce an admixed sludge;
   D. admixing an alginate and an acid with said admixed sludge of said step C to produce a treated sludge having a pH of about 3.0 to about 4.5; and
   E. separating a concentrated activated sludge, as recovered sludge, from said treated sludge.

19. The process of claim 18, wherein said recovered sludge of said step E is fed to a rendering plant.

* * * * *